US012804370B2

(12) United States Patent
Nguyen

(10) Patent No.: US 12,804,370 B2
(45) Date of Patent: Nov. 17, 2026

(54) MONITORING A USER'S ENVIRONMENT TO IDENTIFY POTENTIAL THREATS TO THE USER

(71) Applicant: T-Mobile USA, Inc., Bellevue, WA (US)

(72) Inventor: Phi Hoang Nguyen, Lacey, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 258 days.

(21) Appl. No.: 18/593,129

(22) Filed: Mar. 1, 2024

(65) Prior Publication Data

US 2025/0280279 A1 Sep. 4, 2025

(51) Int. Cl.

| | |
|---|---|
| ***H04W 4/90*** | (2018.01) |
| ***G06V 20/40*** | (2022.01) |
| ***G06V 20/52*** | (2022.01) |
| ***H04W 4/029*** | (2018.01) |

(52) U.S. Cl.

CPC .............. *H04W 4/90* (2018.02); *G06V 20/41* (2022.01); *G06V 20/52* (2022.01); *H04W 4/029* (2018.02)

(58) Field of Classification Search

CPC ........ G06V 20/41; G06V 20/52; G06V 20/44; H04W 4/029; H04W 4/027; H04W 4/90; H04W 4/023

USPC .......................................................... 382/103

See application file for complete search history.

(56) References Cited

U.S. PATENT DOCUMENTS

| | | | |
|---|---|---|---|
| 9,100,245 | B1 | 8/2015 | Andrews et al. |
| 9,607,144 | B1 | 3/2017 | Bird et al. |
| 9,774,907 | B1 | 9/2017 | Bhageria et al. |
| 9,942,332 | B2 | 4/2018 | Chan et al. |
| 10,235,714 | B2 | 3/2019 | Paulrajan et al. |
| 10,565,372 | B1 | 2/2020 | Stickle et al. |
| 10,621,858 | B1 | 4/2020 | Decastro et al. |
| 10,673,880 | B1 | 6/2020 | Pratt et al. |
| 10,747,818 | B2 | 8/2020 | Dasgupta et al. |
| 10,904,289 | B2 | 1/2021 | Tsironis |
| 10,964,191 | B2 | 3/2021 | Jati et al. |

(Continued)

FOREIGN PATENT DOCUMENTS

| | | |
|---|---|---|
| CN | 107690772 A | 2/2018 |
| CN | 104303539 B | 1/2019 |

(Continued)

*Primary Examiner* — Chineyere Wills-Burns
*Assistant Examiner* — Emmanuel Silva-Avina
(74) *Attorney, Agent, or Firm* — Ashurst Perkins Coie US LLP

(57) ABSTRACT

The system obtains streaming information associated with an environment surrounding a UE operating on a network. The streaming information includes an audio and video recording of the environment and is delivered over the network. Based on the information associated with the environment, the system identifies a participant or an object in the environment and monitors an attribute in the environment including a speed of movement of the user, the participant, and the object in the environment. Based on the attribute in environment, the system determines whether an anomaly is occurring in the environment, such as a change in the speed of movement of the user, the participant, or the object in the environment. Upon determining that the anomaly is the threat to the user, the system notifies the user of the threat.

20 Claims, 8 Drawing Sheets

(56) References Cited

U.S. PATENT DOCUMENTS

| | | | | |
|---|---|---|---|---|
| 10,972,888 | B2 * | 4/2021 | Best | H04L 67/51 |
| 11,019,088 | B2 | 5/2021 | Pratt et al. | |
| 11,173,397 | B2 | 11/2021 | Mahlmeister et al. | |
| 11,194,915 | B2 | 12/2021 | Stolfo et al. | |
| 11,606,379 | B1 | 3/2023 | Pratt et al. | |
| 11,666,824 | B2 | 6/2023 | Mahlmeister et al. | |
| 11,743,070 | B2 | 8/2023 | Koch et al. | |
| 11,816,969 | B2 | 11/2023 | Rafferty et al. | |
| 11,838,686 | B2 | 12/2023 | Schneider | |
| 11,886,767 | B2 | 1/2024 | Nguyen | |
| 2015/0248426 | A1 | 9/2015 | Che et al. | |
| 2016/0063387 | A1 | 3/2016 | Srivastava | |
| 2017/0127257 | A1 * | 5/2017 | Saxena | H04W 4/90 |
| 2018/0268674 | A1 | 9/2018 | Siminoff | |
| 2019/0379940 | A1 | 12/2019 | Bentovim et al. | |
| 2020/0175767 | A1 * | 6/2020 | Stivi | G08B 25/10 |
| 2022/0004775 | A1 * | 1/2022 | Flick | G06V 40/20 |
| 2022/0007164 | A1 * | 1/2022 | Sutherland | H04L 63/0853 |
| 2022/0135027 | A1 | 5/2022 | Bravi et al. | |
| 2022/0139204 | A1 * | 5/2022 | Millican | H04N 23/6812 340/573.1 |
| 2022/0189307 | A1 * | 6/2022 | Shmueli Friedland | B60W 30/0956 |
| 2022/0284106 | A1 | 9/2022 | Stolfo et al. | |
| 2022/0335476 | A1 | 10/2022 | Abdel-Wahab et al. | |
| 2023/0008255 | A1 | 1/2023 | Mukherjee | |
| 2023/0117667 | A1 * | 4/2023 | Moulik | G06N 3/02 706/16 |
| 2023/0139000 | A1 | 5/2023 | Apger et al. | |
| 2023/0264102 | A1 | 8/2023 | Mahlmeister et al. | |
| 2023/0354027 | A1 | 11/2023 | Engan et al. | |
| 2024/0036900 | A1 | 2/2024 | Rudraraju et al. | |
| 2024/0039935 | A1 | 2/2024 | Rudraraju et al. | |
| 2024/0071081 | A1 * | 2/2024 | Palamadai | G06Q 50/265 |
| 2024/0194046 | A1 * | 6/2024 | Younge | G08B 31/00 |

FOREIGN PATENT DOCUMENTS

| | | | |
|---|---|---|---|
| CN | 105359484 | B | 6/2019 |
| CN | 107250949 | B | 5/2020 |
| CN | 110709930 | B | 12/2023 |
| DE | 102019129050 | A1 | 4/2020 |
| DE | 102021110055 | A1 | 10/2021 |
| EP | 1297450 | A2 | 4/2003 |
| EP | 1485821 | A2 | 12/2004 |
| EP | 2137620 | A1 | 12/2009 |
| EP | 2718850 | A1 | 4/2014 |
| EP | 2786268 | A1 | 10/2014 |
| EP | 2924603 | A2 | 9/2015 |
| EP | 2936445 | A2 | 10/2015 |
| EP | 3120578 | A1 | 1/2017 |
| EP | 3161769 | A1 | 5/2017 |
| EP | 3251291 | A1 | 12/2017 |
| EP | 3420701 | B1 | 6/2021 |
| EP | 3885972 | A1 | 9/2021 |
| JP | 5472887 | B2 | 2/2014 |
| JP | 6745419 | B1 | 8/2020 |
| KR | 101836016 | B1 | 3/2018 |
| KR | 102338888 | B1 | 12/2021 |
| KR | 102474247 | B1 | 12/2022 |
| KR | 102551081 | B1 | 7/2023 |
| WO | 2008133762 | A1 | 11/2008 |
| WO | 2009128398 | A1 | 10/2009 |
| WO | 2013166126 | A1 | 11/2013 |
| WO | 2014139059 | A1 | 9/2014 |
| WO | 2015013294 | A1 | 1/2015 |
| WO | 2015200876 | A1 | 12/2015 |
| WO | 2016097998 | A1 | 6/2016 |
| WO | 2018158643 | A1 | 9/2018 |
| WO | 2018175328 | A1 | 9/2018 |
| WO | 2018222756 | A1 | 12/2018 |
| WO | 2019018033 | A2 | 1/2019 |
| WO | 2019018083 | A1 | 1/2019 |
| WO | 2021051573 | A1 | 3/2021 |
| WO | 2021228417 | A1 | 11/2021 |

* cited by examiner

MONITORING A USER'S ENVIRONMENT TO IDENTIFY POTENTIAL THREATS TO THE USER

BACKGROUND

As the world advocates for a healthier environment, the overarching goal is to enhance human health over time. On a personal level, there is a collective effort to adopt healthier lifestyles, focusing on proper nutrition and increased physical activity. A noticeable trend is the growing number of individuals engaging in outdoor activities such as walking, hiking, and traveling. However, the changing landscape of our society has introduced new challenges, with not everyone feeling secure while navigating alone, even within their own neighborhoods. Incidents of violence occur daily and at any time, ranging from minor robberies to more severe incidents like shootings. In response to this evolving reality, safety concerns are prompting individuals, not just children, to adopt precautionary measures. Just as parents advise their kids to stay vigilant when walking alone, adults are now applying the same safety principles to safeguard themselves in an environment where uncertainties prevail.

BRIEF DESCRIPTION OF THE DRAWINGS

Detailed descriptions of implementations of the present invention will be described and explained through the use of the accompanying drawings.

Figure 1:
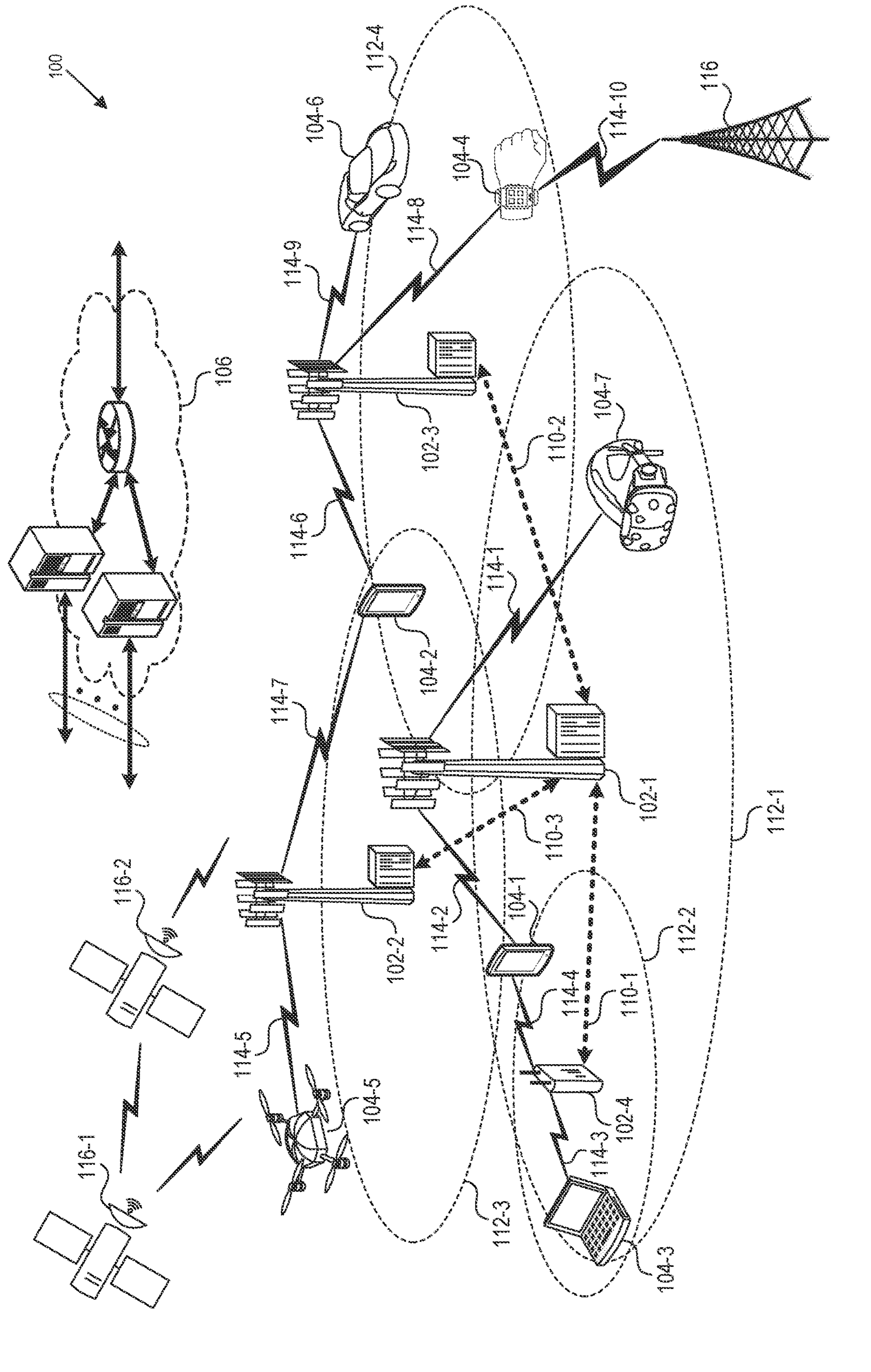
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

To address the abovementioned challenges, a real-time smart device becomes essential-a device capable of tracking, evaluating, and advising the user on potential hazards that necessitate immediate action. This intelligent tool can serve as a personal safety assistant, providing timely alerts and guidance to ensure the user's well-being. In instances where personal intervention may be challenging, the device can possess the capability to automatically notify the user's family members and relevant authorities, facilitating prompt assistance and ensuring a safe resolution to the situation to minimize the risk of personal injury. This proactive and interconnected approach reflects the growing need for technology to seamlessly integrate with our lives, prioritizing safety and well-being in an ever-evolving world.

The disclosed device is a personal smart device that individuals can carry outdoors, whether walking, hiking, or driving. This device can harness the power of LLMs and GenAI over a high-speed 5G network to provide real-time intelligence and communication capabilities. The device can achieve almost 100% accuracy in detecting and predicting potential outcomes, empowering individuals to proactively protect their own safety in various environments and situations.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
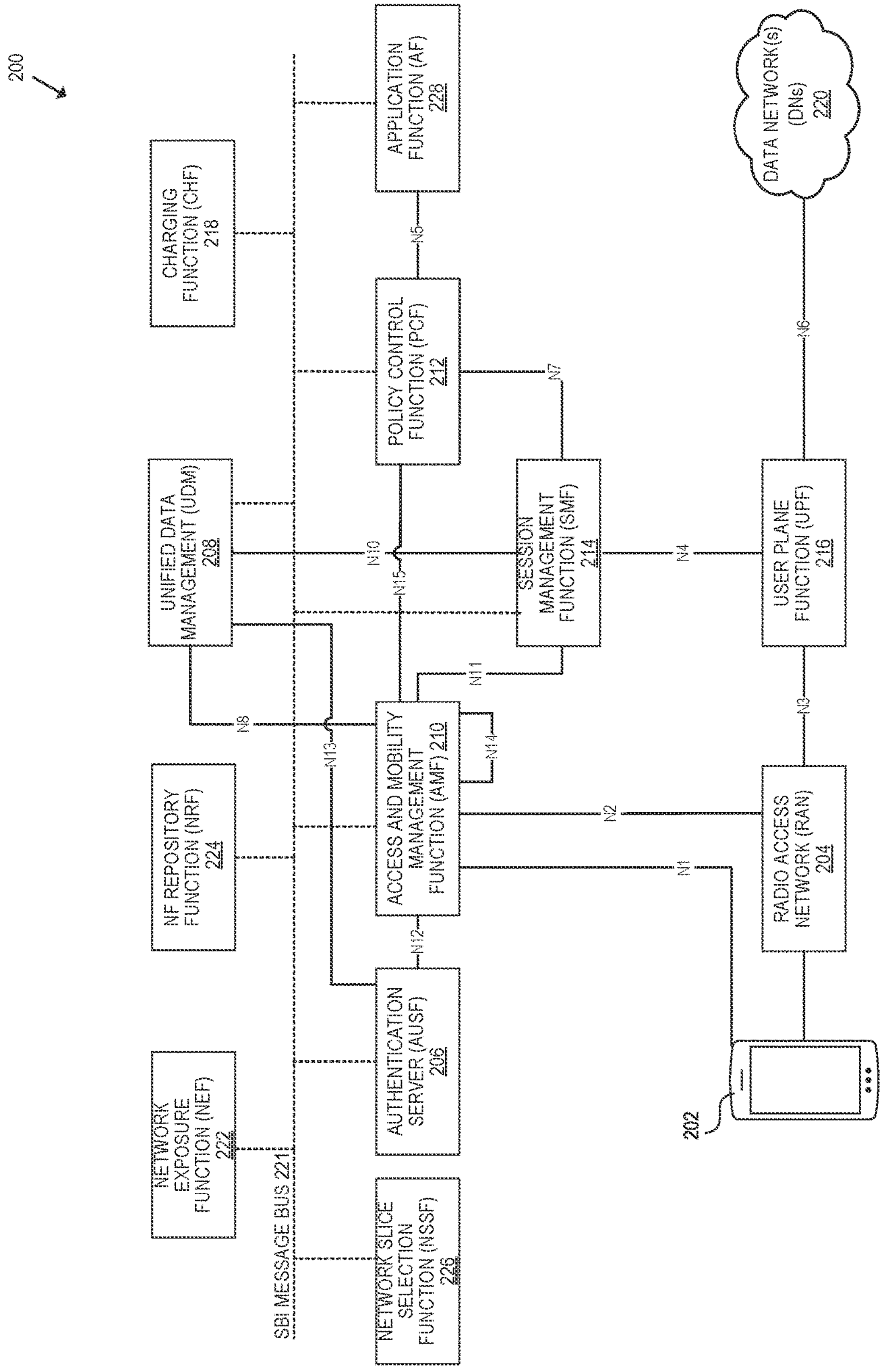
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Monitoring a User's Environment to Identify Potential Threats to the User

Figure 3:
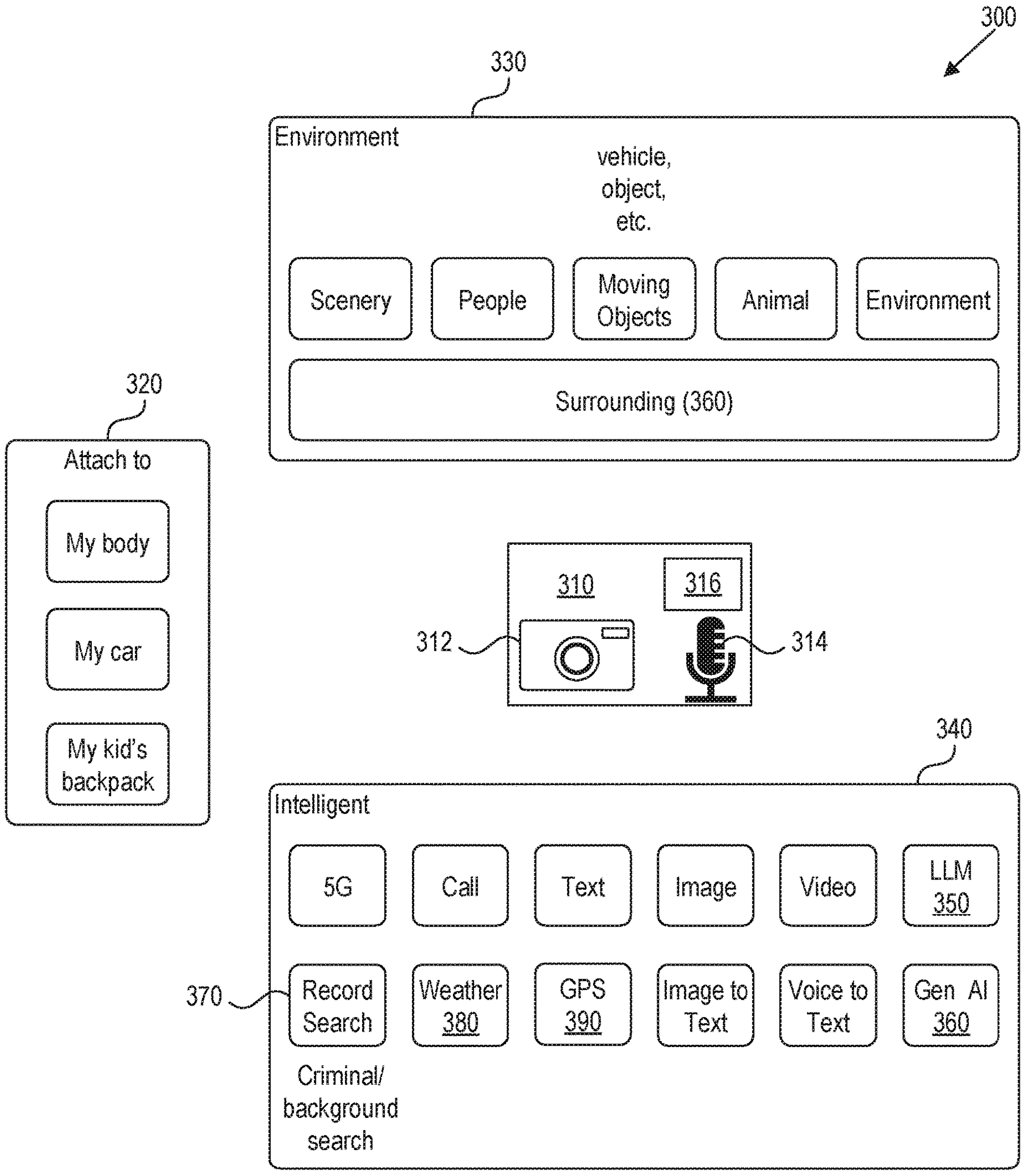
FIG. 3 illustrates key components of the disclosed system.

FIG. 3 illustrates key components of the disclosed system. The system 300 can include a smart device 310, an attachment device 320, an environment module 330, and an intelligence module 340.

The smart device 310 can be a compact and intelligent wearable device, such as a UE including a mobile phone, augmented reality/virtual reality glasses, a watch, a heart monitor, etc. attached or carried anywhere on the body, in the automobile, or with tools used outdoors. The smart device 310 can serve as the primary data collector. The smart device 310 can include a camera 312 and a microphone 314 to capture images, voices, and ambient sounds in the nearby vicinity and gathers additional contextual information. In addition, the smart device 310 can include an accelerometer 316 to monitor the speed and acceleration of the user. The built-in intelligence module 340 can utilize this data to predict potential risks or threats. Equipped with a SIM card for connectivity over a 5G high-speed network, the smart device 310 can reach out for external assistance through the network 100 in FIG. 1. Access to a 5G high-speed network is important because the system 300 can upload the video and audio recordings for analysis to the cloud, and such high-bandwidth data can be communicated on the 5G network or higher generation wireless telecommunication networks.

The attachment device 320 can be a hook-and-loop attachment mechanism attached to the smart device 310 on one end and to a piece of clothing such as a headband, a shirt, a jacket, etc. Alternatively, the attachment device 320 can be attached to an accessory such as a necklace, earrings, a backpack, etc. The attachment device 320 can also be a mounting mechanism to attach to a vehicle such as a bike, a motorcycle, a car, etc. In some embodiments, the attachment device 320 can simply be an integrated circuit that enables the system 300 to be integrated into an existing camera such as a car front or back camera.

The environment module 330 can receive a video and/or audio recorded by the smart device 310 and can identify various objects such as a person, a moving object, an animal, terrain, plants, etc. In addition, the environment module 330 can receive accelerometer readings including speed and acceleration of the user.

The intelligent module 340 can include a large language model (LLM) 350, and/or generative artificial intelligence (GenAI) 360. The intelligent module 340, with high-speed internet connectivity such as 5G network 100, can access external data sources such as government records 370, weather data 380, and location/location-specific information 390. All this data 370, 380, 390 can be provided to GenAI 360, enabling the smart device 310 to predict potential threats and provide crucial information to the user.

In addition, the LLM 350 and/or the GenAI 360 can analyze the video and audio recorded by the smart device 310 to identify hazardous terrains, such as a mountainous terrain prone to slipping, especially under current weather conditions. In urban environments, the LLM 350 and/or the GenAI 360 can identify potentially threatening individuals based on background checks. Based on the identified threats, the smart device 310 can provide a timely alert to enable avoidance.

Figure 4:
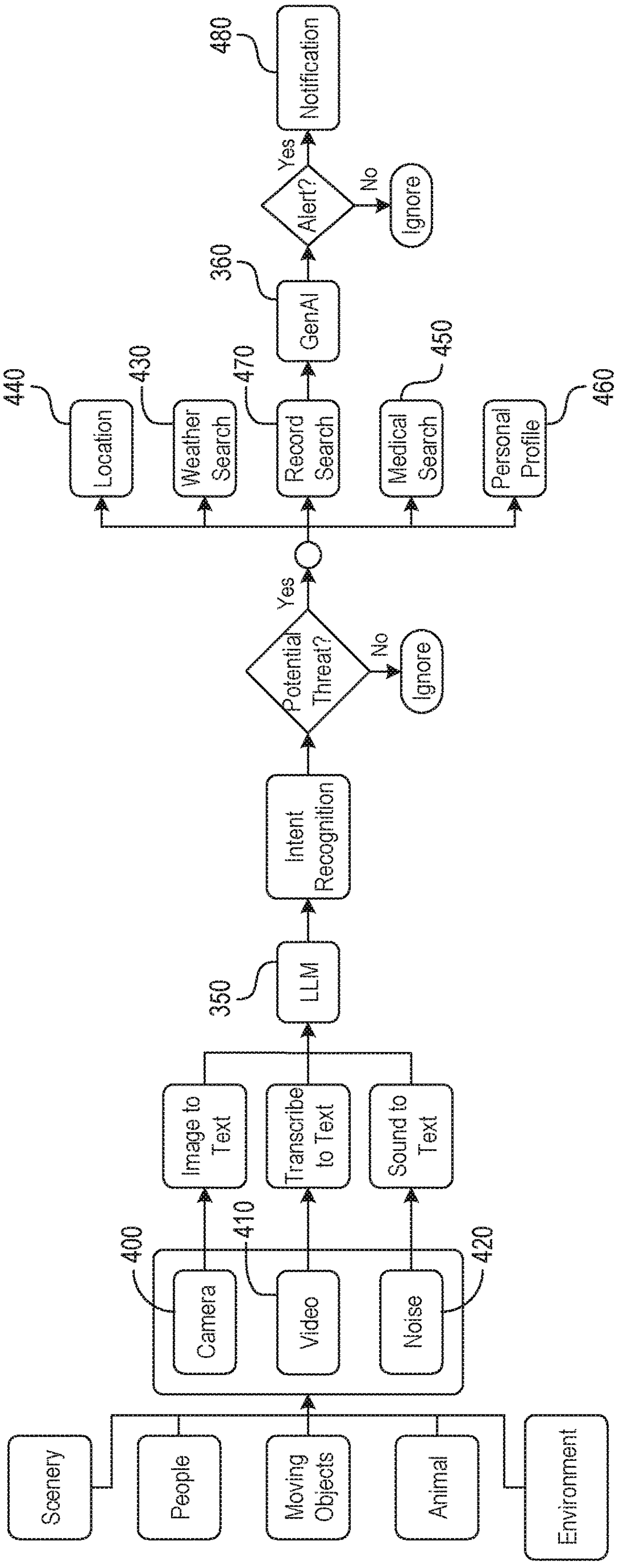
FIG. 4 delineates the primary flow of intelligence within the smart device, detailing the process from event capture to recognition outcomes.

FIG. 4 delineates the primary flow of intelligence within the smart device, detailing the process from event capture to recognition outcomes. Equipped with embedded cameras and sound recognition capabilities, the device captures images 400, video 410 including movements, and sounds 420 from a distance significant enough to allow ample time for event processing, user notification, and user response.

The system 300 in FIG. 3 can convert the captured images 400, videos 410, and sounds 420 into equivalent text, enabling LLM 350 to comprehend and analyze the visual and audio data. Addressing security concerns, the system 300 can focus on scenarios where the surrounding environment is calm, with limited and unique movements. For instance, when walking alone during early mornings or late nights in quiet neighborhoods when attacks are more likely, the system 300 can concentrate on a person's movement, face recognition, and emotion recognition, identifying potential threats for further processing while ignoring irrelevant objects. To ascertain the likelihood of a potential threat, the system 300 can leverage external government data for criminal background searches and matches with historical records. Further, the system can consider the latest trend events in the surrounding location, such as crime reports, and can use GenAI 360 to infer possible outcomes.

The system 300 can also monitor threats from the environment due to the weather. For example, during extreme weather conditions while hiking in the mountains, where wind, snow, low visibility, and rare incidents pose recognition challenges, the system 300 can recognize when a debilitating event occurs and automatically notify external resources for assistance. For example, if a user falls or slips from a high hill and gets hurt, the system 300 can recognize the debilitating event by considering factors such as abnormal speed of the user and surrounding object movement, changes in elevation, alterations in the surrounding scenery, and user sounds indicating distress. LLM 350 can categorize the situation, and with additional external weather and temperature data 430, location 440, medical records associated with the user 450, demographic information associated with the user, e.g., personal profile 460, and crime reports 470 associated with the location 440, GenAI 360 can infer that the user is in trouble and can send an alert 480, as described in this application.

In cases of natural or human-caused disasters like hurricanes or fires, the system 300 can employ captured images 400, video 410, and sounds 420 to determine if the surrounding environment is unsafe for the user, promptly notifying the user to take appropriate action. This comprehensive approach ensures that the system 300 intelligently assesses a range of situations, enhancing user safety in diverse scenarios.

The system 300 can record the surrounding environment and store the recordings in a database. The recordings can be indexed by location, and across multiple users, to establish a normal occurrence for the environment. The system 300 can detect an anomaly in the environment by comparing the current recording to the previously recorded video and audio of the environment. The system 300 can detect an anomaly, e.g., an unusual occurrence, in the current video, such as multiple people running.

For example, the system 300 can analyze the speed of the running people and the direction of movement of the running people, such as whether the running people are going toward the user. If the people running are fast and running toward the user, the system 300 can detect an anomaly. To determine whether the anomaly is a threat, the system 300 can utilize the user's personal profile including demographic information such as age, gender, and medical records.

If the user is older, such as over 60, or a young person, such as below 15, and/or female, the user may be exposed to a higher risk of violence, and the threshold to determine that an anomaly is a threat can be lower. For example, if the user is exposed to a higher risk of violence, the system 300 can determine that the anomaly is a threat even if a single person is running toward the user. However, if the user is not exposed to a higher risk of violence, the system 300 can determine that the anomaly is a threat only when two or more people are running toward the user.

Figure 5:
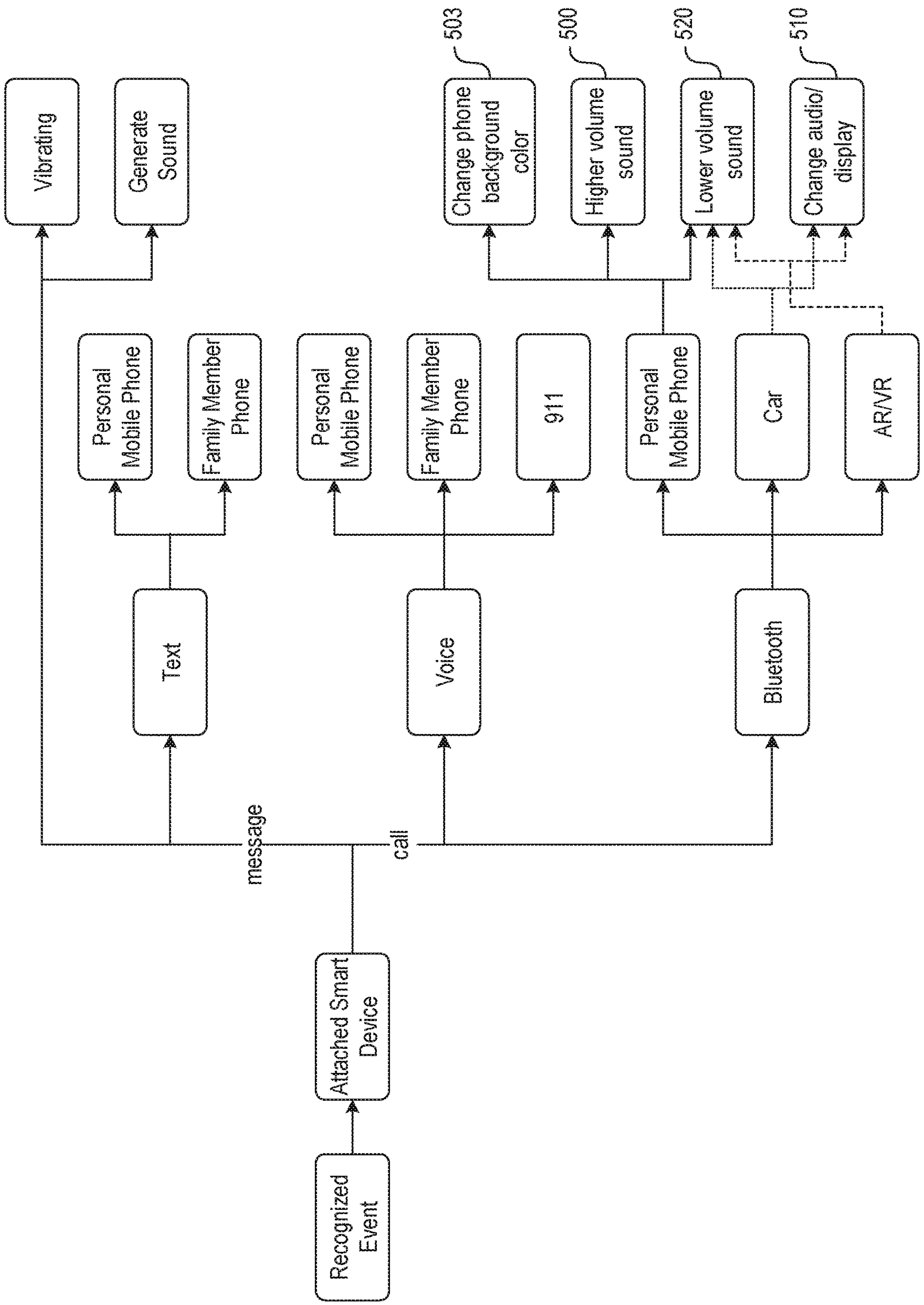
FIG. 5 centers on delivering threat notifications to the user and potential assistance providers.

FIG. 5 centers on delivering threat notifications to the user and potential assistance providers. Utilizing the capabilities of 5G networks, the device can promptly notify the user, family members, or disaster support authorities via voice or messaging. This not only serves as a potential lifesaver for the user but can also benefit the affected community.

In the earlier example of a user falling off a cliff, such notifications can expedite external support, such as family and friends, to the precise location, significantly improving response times. With Bluetooth functionality, the system 300 in FIG. 3 can seamlessly connect to various external devices accessible to the user's family and friends. The system 300 can modify the current visual and auditory stimuli that one of the user's family and friends is currently focused on or attached to, ensuring immediate notification.

For example, when the system 300 is attached to an automobile of one of the user's family and friends, the system 300 can adjust the internal car entertainment system 300, changing audio volume in step 500, transmitting the notification through the car speakers, or flashing dashboard visuals with different colors in step 510. If the one of the user's family and friends is listening to music through earbuds while walking or hiking, the system 300 can alter the user's sound experience by, in step 520, lowering the volume of or pausing the music and sending the notification regarding the threat over the same earbuds. If one of the user's family and friends is viewing a UE, the system 300, in step 530, can change the phone background color, send a message to the UE team, or place a call to the UE indicating the threat. These adaptive mechanisms ensure that the user receives timely and effective notifications, capturing their attention precisely when needed.

Figure 6:
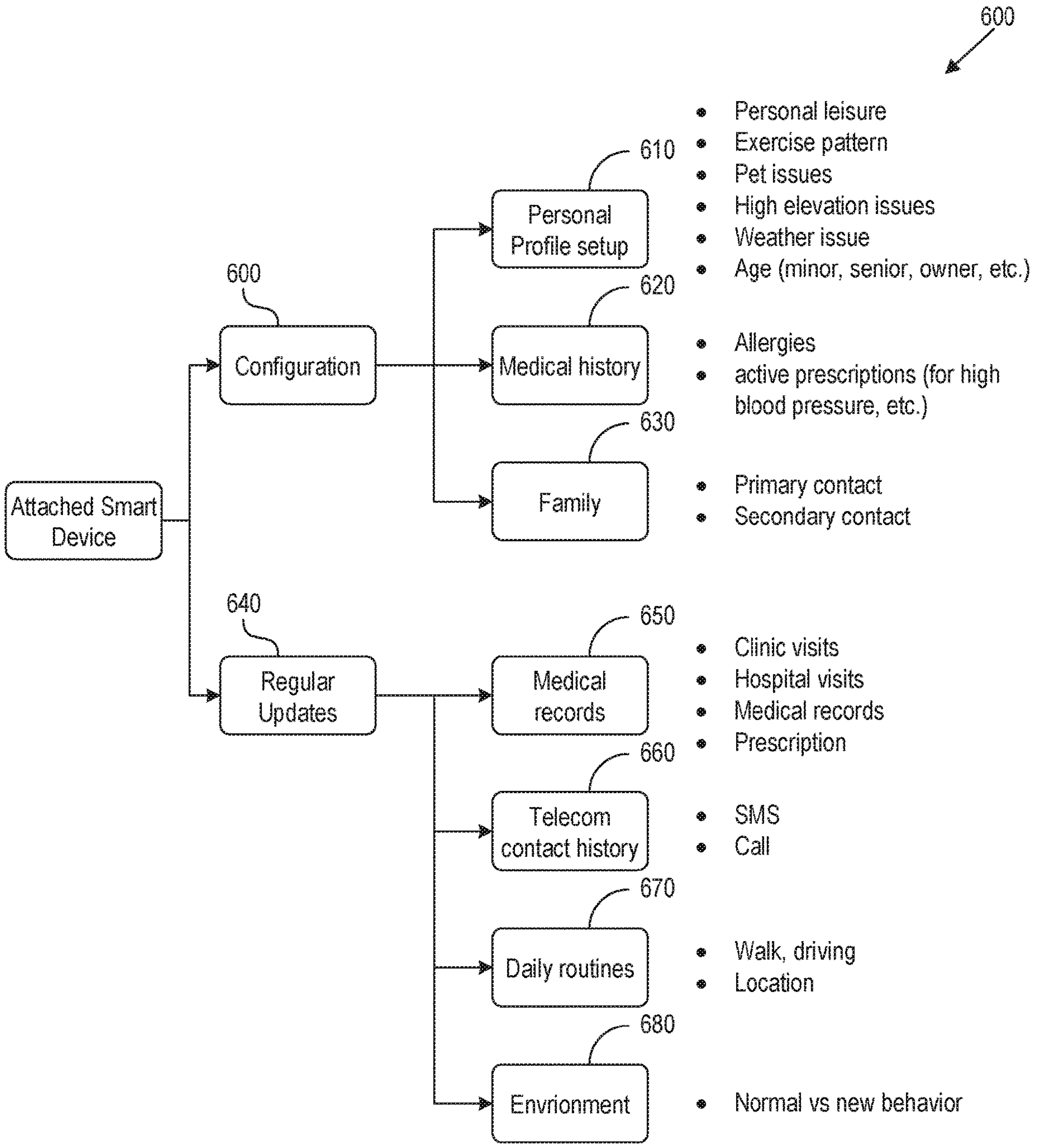
FIG. 6 shows the steps involved in personalizing the smart device, emphasizing the necessity of an initial setup to recognize the device owner, given that each user's situation is unique.

FIG. 6 shows the steps involved in personalizing the smart device, emphasizing the necessity of an initial setup to recognize the device owner, given that each user's situation is unique. The system 300 in FIG. 3 continually adapts to the ongoing activities performed by the user, gradually establishing a new normal based on their evolving behaviors.

In step 600, the system 300 can be configured to recognize the owner effectively. In step 610, the system can receive information about the user's demographics, such as age and gender, which can enable the system to categorize and assess threat levels, considering distinctions between children and adults or males and females. In addition, in step 610, the system can obtain information about the user's exercise pattern, pets, preferences regarding the weather, preferences regarding elevation, etc. In step 620, the system 300 can obtain the user's medical history, including the user's allergies and active prescriptions. In step 630, the system 300 can obtain access to the user's personal contact list and reach out to contacts and recognize whether the same contact is facing a similar emergency. Specifically, in step 630, the system 300 can obtain a list of frequent contacts associated with the user and add those to the user's emergency contacts associated with the system.

In step 640, the system 300 can update the information about the user as the user engages in diverse activities and navigates through different environments to discern the evolving new normal of the user. When deviations from this established norm occur in the surrounding environment, the system 300 can promptly recognize potential threats that the user needs to be aware of.

Specifically, in step 650, the system 300 can obtain updated medical records including clinic visits, hospital visits, new medical records, and new prescription records. In step 660, the system 300 can obtain, through the network 100 in FIG. 1, telecommunication contact history including text messages and calls. In step 670, the system 300 can obtain the user's evolving daily routines, such as the user's daily walk times and driving times and the user's daily location. In step 680, the system 300 can keep recording the environment in which the user is located, storing the recordings so that future analysis of the environments can keep an accurate estimate of a normal occurrence in the environment, as described in this application.

Figure 7:
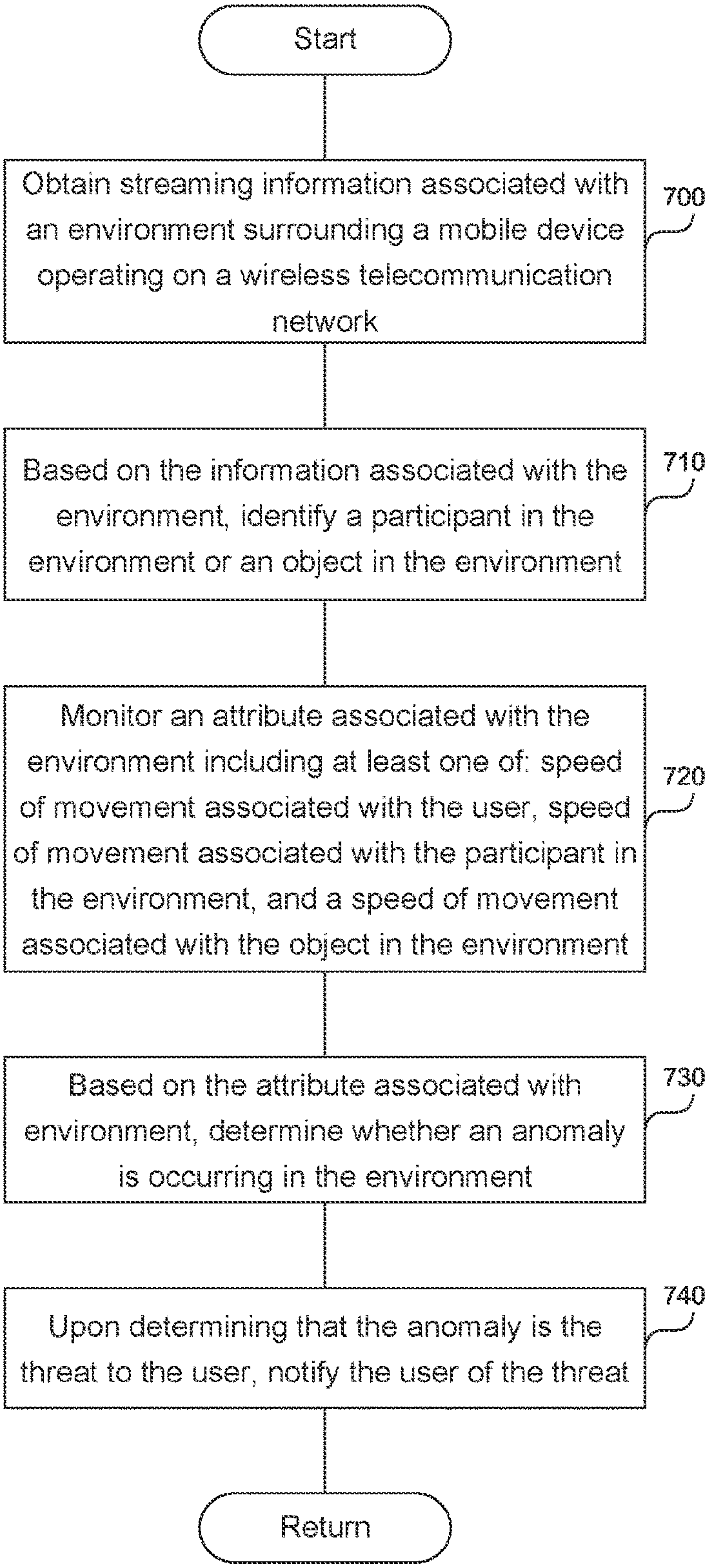
FIG. 7 is a flowchart of a method to monitor a user's environment to identify potential threats to the user.

FIG. 7 is a flowchart of a method to monitor a user's environment to identify potential threats to the user. A hardware or software processor executing instructions describing this application can, in step 700, obtain streaming information associated with an environment surrounding a UE operating on a high-speed wireless telecommunication network, such as a 5G wireless network or higher generation wireless network. The streaming information can include an audio recording of the environment and a video recording of the environment. The streaming information needs to be delivered over the 5G wireless telecommunication network or a higher generation wireless telecommunication network because of the high-bandwidth requirements of communicating video, e.g., over 1.1 megabits per second.

In step 710, based on the information associated with the environment, the processor can identify a participant in the environment, such as a person or an animal, or an object in the environment, such as a vehicle, vegetation, terrain, etc.

In step 720, the processor can monitor an attribute associated with the environment including at least one of a speed of movement associated with the user, a speed of movement associated with the participant in the environment, and a speed of movement associated with the object in the environment.

In step 730, based on the attribute associated with environment, the processor can determine whether an anomaly is occurring in the environment, where the anomaly includes a change in the speed of movement associated with the user, a change in the speed of movement associated with the participant in the environment, or a change in the speed of movement associated with the object in the environment. For example, if an object or participant is moving at a high speed toward the user, such as above 6 miles an hour, the processor can detect an anomaly. In addition, the processor can monitor the speed of the user and can detect activities such as driving, hiking, walking, running, or skiing. If there is a sudden increase in speed, such as above 5 miles an hour, followed by a sudden stop, such as a deceleration above 10 miles an hour, the processor can determine that there is an anomaly occurring. In step 740, upon determining that the anomaly is the threat to the user, the processor can notify the user of the threat.

In addition to the speed, the processor can obtain demographic information associated with the user of the UE including age, gender, and a medical condition associated with the user. Upon determining that the anomaly is occurring in the environment, the processor can determine whether the anomaly is a threat to the user based on the user's age, gender, and the medical condition. For example, if the user is frail, or small, or has heart problems, anomalies can become threats that otherwise would not be. A more specific example is if a user is above 10 years of age, and there is a car coming toward the user at a speed of 30 miles an hour or less, the processor does not detect a threat. However, if the user is less than 10 years of age and there is a car coming toward the user at the speed of 30 miles an hour or less, the processor can detect a threat because the child may not notice the car and know to walk to the sidewalk.

The processor can obtain a history of the recordings of the video of the environment. The processor can determine whether a significant difference exists between the history recordings of the video and the video recording, where the significant difference includes a weapon in the video recording or an erratic participant in the video. Upon determining that the significant difference exists between the history recordings of the video and the video recording, the processor can notify the user of the threat.

The processor can obtain a location associated with the UE and a crime report associated with the location. The processor can obtain from the crime report demographic information associated with a victim, such as age and gender. The processor can obtain demographic information associated with the user. The processor can determine whether the demographic information associated with the user matches the demographic information associated with the victim. Upon determining that the demographic information associated with the user matches the demographic information associated with the victim, the processor can notify the user of the threat.

The processor can include environmental concerns in assessing the threat. The processor can obtain a location associated with the UE and determine whether a weather warning associated with the location exists. The processor can determine whether the audio recording indicates a sound of distress associated with the user. Upon determining that the weather warning exists and that the audio recording indicates the sound of distress associated with the user, the processor can obtain a frequent contact associated with the UE. The processor can notify the frequent contact of the threat to the user.

The processor can obtain people associated with the user to notify, including friends, family, and rescue personnel. Upon determining that the anomaly is the threat to the user, the processor can obtain an emergency contact associated with the user. To obtain the emergency contact, the processor can obtain emergency contact information from an application associated with the described system, or the processor can obtain contact information from the list of frequent contacts associated with the UE. The processor can notify the emergency contact associated with the user of the threat to the user.

The processor can choose who to notify based on the proximity to the user under threat. For example, upon determining that the anomaly is the threat to the user, the processor can obtain a contact information associated with a second UE by obtaining frequent contacts associated with the user from the UE. The second UE is associated with a second user, who is a frequent contact of the user, and where the second user is physically proximate to the user. The processor can send the alert to the second UE that the anomaly is the threat to the user.

Computer System

Figure 8:
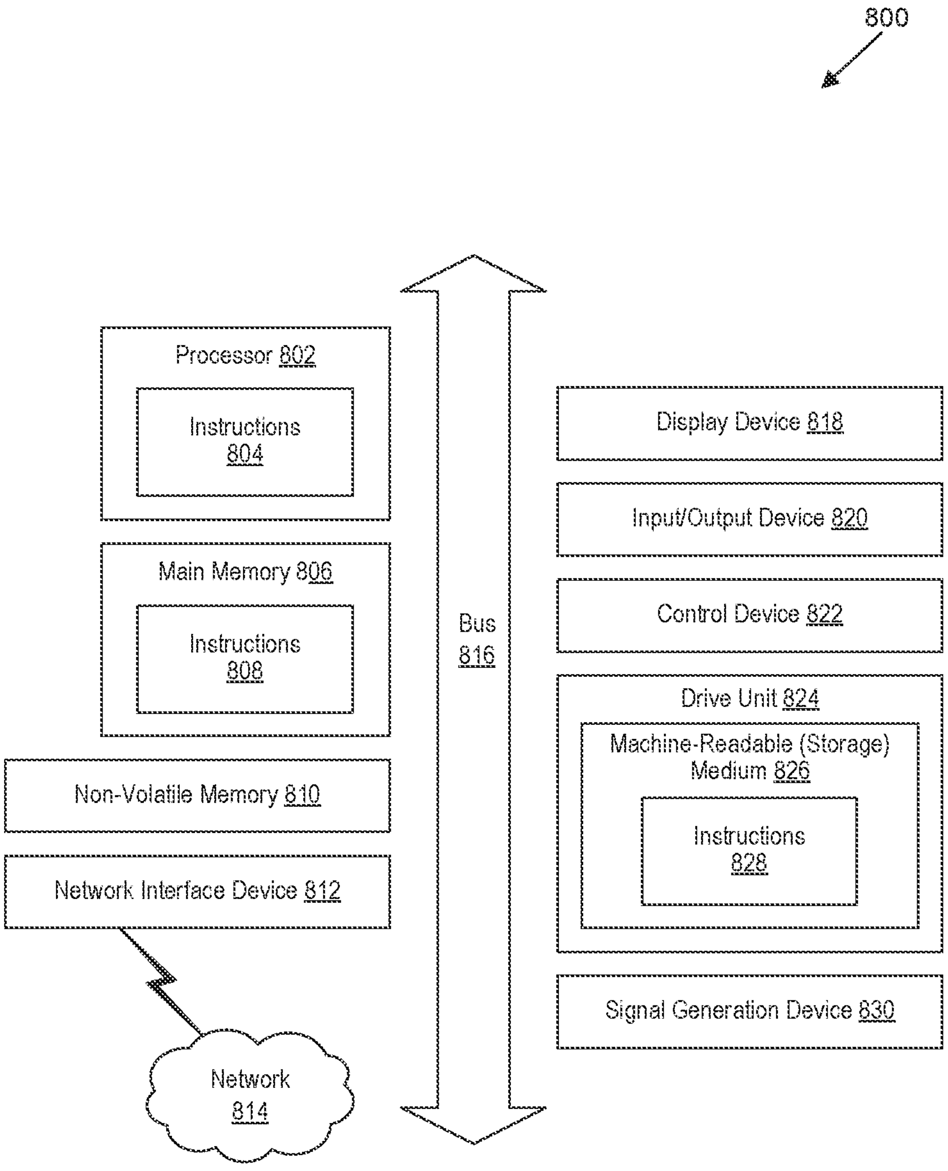
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the Figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementations, the computer system 800 can be an embedded computer system, a system-on-chip (SOC), a single-board computer system (SBC), or a distributed system such as a mesh of computer systems, or it can include one or more cloud components in one or more networks. Where appropriate, one or more computer systems 800 can perform operations in real time, in near real time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A non-transitory, computer-readable storage medium comprising instructions recorded thereon, wherein the instructions, when executed by at least one data processor of a system, cause the system to:

obtain streaming information associated with an environment surrounding a mobile device operating on a 5G wireless telecommunication network, wherein the streaming information includes an audio recording of the environment and a video recording of the environment, wherein the streaming information is delivered over the 5G wireless telecommunication network, and wherein the mobile device is attached to a user or an item associated with the user;

based on the streaming information associated with the environment, identify a person in the environment and an object in the environment;

monitor multiple attributes associated with the environment including a speed of movement associated with the user, a speed of movement associated with the person in the environment, and a speed of movement associated with the object in the environment;

based on the multiple attributes associated with the environment, detect an activity associated with the user or the item associated with the user, and determine whether an anomaly is occurring in the environment, wherein the anomaly includes a change in the speed of movement associated with the user, a change in the speed of movement associated with the person in the environment, or a change in the speed of movement associated with the object in the environment; and upon determining that the anomaly is a threat to the user based on the detected activity associated with the user or the item associated with the user, notify the user of the threat via a device connected to the mobile device, wherein a notification modality is adapted based on a type of the device.

2. The non-transitory, computer-readable storage medium of claim 1, comprising instructions to:

obtain a location associated with the mobile device, and a crime report associated with the location;

obtain, from the crime report, demographic information associated with a victim;

obtain demographic information associated with the user;

determine whether the demographic information associated with the user matches the demographic information associated with the victim; and upon determining that the demographic information associated with the user matches the demographic information associated with the victim, notify the user of the threat.

3. The non-transitory, computer-readable storage medium of claim 1, comprising instructions to:

obtain information associated with the user of the mobile device including age, gender, and a medical condition associated with the user; and upon determining the anomaly is occurring in the environment, determine whether the anomaly is the threat to the user based on the user's age, gender, and the medical condition.

4. The non-transitory, computer-readable storage medium of claim 1, comprising instructions to:

obtain a history of video recordings of the environment;

determine whether a significant difference exists between the history of video recordings and the video recording, wherein the significant difference includes a weapon in the video recording, or an erratic person in the video recording; and upon determining that the significant difference exists between the history of video recordings and the video recording, notify the user of the threat.

5. The non-transitory, computer-readable storage medium of claim 1, comprising instructions to:

obtain a location associated with the mobile device;

determine whether a weather warning associated with the location exists;

determine whether the audio recording indicates a sound of distress associated with the user;

upon determining that the weather warning exists and that the audio recording indicates the sound of distress associated with the user, obtain a frequent contact associated with the mobile device; and notify the frequent contact of the threat to the user.

6. The non-transitory, computer-readable storage medium of claim 1, comprising instructions to:

upon determining that the anomaly is the threat to the user, obtain an emergency contact associated with the user; and notify the emergency contact associated with the user of the threat to the user.

7. The non-transitory, computer-readable storage medium of claim 1, comprising instructions to:

upon determining that the anomaly is the threat to the user, obtain a contact information associated with a second mobile device, wherein the second mobile device is associated with a second user, wherein the second user is physically proximate to the user; and send an alert to the second mobile device that the anomaly is the threat to the user.

8. A method comprising:

obtaining streaming information associated with an environment surrounding a user equipment (UE) operating on a wireless telecommunication network, wherein the streaming information includes an audio recording of the environment and a video recording of the environment, wherein the streaming information is delivered over the wireless telecommunication network, and wherein the UE is attached to a user or an item associated with the user;

based on the streaming information associated with the environment, identifying a participant in the environment or an object in the environment;

monitoring an attribute associated with the environment including at least one of: a speed of movement associated with the user, a speed of movement associated with the participant in the environment, and a speed of movement associated with the object in the environment;

based on the attribute associated with the environment, detecting an activity associated with the user or the item associated with the user, and determining whether an anomaly is occurring in the environment, wherein the anomaly includes a change in the speed of movement associated with the user, a change in the speed of movement associated with the participant in the environment, or a change in the speed of movement associated with the object in the environment; and upon determining that the anomaly is a threat to the user based on the detected activity associated with the user or the item associated with the user, notifying the user of the threat via a device connected to the UE, wherein a notification modality is adapted based on a type of the device.

9. The method of claim 8, comprising:

obtaining information associated with the user of the UE including age, gender, and a medical condition associated with the user; and upon determining the anomaly is occurring in the environment, determining whether the anomaly is the threat to the user based on the user's age, gender, and the medical condition.

10. The method of claim 8, comprising:

obtaining a history of video recordings of the environment;

determining whether a significant difference exists between the history of video recordings and the video recording, wherein the significant difference includes a weapon in the video recording, or an erratic person in the video recording; and upon determining that the significant difference exists between the history of video recordings and the video recording, notifying the user of the threat.

11. The method of claim 8, comprising:

obtaining a location associated with the UE, and a crime report associated with the location;

obtaining, from the crime report, demographic information associated with a victim;

obtaining demographic information associated with the user;

determining whether the demographic information associated with the user matches the demographic information associated with the victim; and upon determining that the demographic information associated with the user matches the demographic information associated with the victim, notifying the user of the threat.

12. The method of claim 8, comprising:

obtaining a location associated with the UE;

determining whether a weather warning associated with the location exists;

determining whether the audio recording indicates a sound of distress associated with the user;

upon determining that the weather warning exists and that the audio recording indicates the sound of distress associated with the user, obtaining a frequent contact associated with the UE; and notifying the frequent contact of the threat to the user.

13. The method of claim 8, comprising:

upon determining that the anomaly is the threat to the user, obtaining a contact information associated with a second UE, wherein the second UE is associated with a second user, wherein the second user is physically proximate to the user; and sending an alert to the second UE that the anomaly is the threat to the user.

14. A system comprising:

at least one hardware processor; and at least one non-transitory memory storing instructions, which, when executed by the at least one hardware processor, cause the system to:

obtain streaming information associated with an environment surrounding a user equipment (UE) operating on a wireless telecommunication network, wherein the streaming information includes an audio recording of the environment and a video recording of the environment, wherein the streaming information is delivered over the wireless telecommunication network, and wherein the UE is attached to a user or an item associated with the user;

based on the streaming information associated with the environment, identify a participant in the environment or an object in the environment;

monitor an attribute associated with the environment including at least one of: a speed of movement associated with the user, a speed of movement associated with the participant in the environment, and a speed of movement associated with the object in the environment;

based on the attribute associated with the environment, detect an activity associated with the user or the item associated with the user, and determine whether an anomaly is occurring in the environment, wherein the anomaly includes a change in the speed of movement associated with the user, a change in the speed of movement associated with the participant in the environment, or a change in the speed of movement associated with the object in the environment; and upon determining that the anomaly is a threat to the user based on the detected activity associated with the user or the item associated with the user, notify the user of the threat via a device connected to the UE, wherein a notification modality is adapted based on a type of the device.

15. The system of claim 14, comprising instructions to:

obtain information associated with the user of the UE including age, gender, and a medical condition associated with the user; and upon determining the anomaly is occurring in the environment, determine whether the anomaly is the threat to the user based on the user's age, gender, and the medical condition.

16. The system of claim 14, comprising instructions to:

obtain a history of video recordings of the environment;

determine whether a significant difference exists between the history of video recordings and the video recording, wherein the significant difference includes a weapon in the video recording, or an erratic person in the video recording; and upon determining that the significant difference exists between the history of video recordings and the video recording, notify the user of the threat.

17. The system of claim 14, comprising instructions to:

obtain a location associated with the UE, and a crime report associated with the location;

obtain, from the crime report, demographic information associated with a victim;

obtain demographic information associated with the user;

determine whether the demographic information associated with the user matches the demographic information associated with the victim; and upon determining that the demographic information associated with the user matches the demographic information associated with the victim, notify the user of the threat.

18. The system of claim 14, comprising instructions to:

obtain a location associated with the UE;

determine whether a weather warning associated with the location exists;

determine whether the audio recording indicates a sound of distress associated with the user;

upon determining that the weather warning exists and that the audio recording indicates the sound of distress associated with the user, obtain a frequent contact associated with the UE; and notify the frequent contact of the threat to the user.

19. The system of claim 14, comprising instructions to:

upon determining that the anomaly is the threat to the user, obtain an emergency contact associated with the user; and notify the emergency contact associated with the user of the threat to the user.

20. The system of claim 14, comprising instructions to:

upon determining that the anomaly is the threat to the user, obtain a contact information associated with a second UE, wherein the second UE is associated with a second user, wherein the second user is physically proximate to the user; and send an alert to the second UE that the anomaly is the threat to the user.

* * * * *